United States Patent
Taki et al.

(10) Patent No.: US 12,240,204 B2
(45) Date of Patent: Mar. 4, 2025

(54) LAMINATE AND INSULATED GLAZING

(71) Applicant: AGC Inc., Tokyo (JP)

(72) Inventors: Shunya Taki, Tokyo (JP); Naoko Okada, Tokyo (JP)

(73) Assignee: AGC INC., Tokyo (JP)

( * ) Notice: Subject to any disclaimer, the term of this patent is extended or adjusted under 35 U.S.C. 154(b) by 492 days.

(21) Appl. No.: 17/677,634

(22) Filed: Feb. 22, 2022

(65) Prior Publication Data

US 2022/0184927 A1 Jun. 16, 2022

Related U.S. Application Data

(63) Continuation of application No. PCT/JP2020/028288, filed on Jul. 21, 2020.

(30) Foreign Application Priority Data

Sep. 9, 2019 (JP) ................. 2019-163998

(51) Int. Cl.
*B32B 15/04* (2006.01)
*B32B 17/06* (2006.01)
*B32B 17/10* (2006.01)

(52) U.S. Cl.
CPC .. *B32B 17/10201* (2013.01); *B32B 17/10036* (2013.01); *B32B 2307/204* (2013.01); *B32B 2307/304* (2013.01); *B32B 2307/412* (2013.01); *B32B 2307/732* (2013.01)

(58) Field of Classification Search
CPC .............................................. B32B 17/10036
USPC ................................................. 428/432, 434
See application file for complete search history.

(56) References Cited

U.S. PATENT DOCUMENTS

| | | | | |
|---|---|---|---|---|
| 7,745,009 B2 * | 6/2010 | Decroupet | ........... | C03C 17/3644 |
| | | | | 359/360 |
| 8,119,194 B2 * | 2/2012 | Koekert | ................... | C03C 17/36 |
| | | | | 427/248.1 |
| 8,133,589 B2 * | 3/2012 | List | .......................... | C03C 17/36 |
| | | | | 428/432 |

(Continued)

FOREIGN PATENT DOCUMENTS

| | | |
|---|---|---|
| JP | 2014-508093 A | 4/2014 |
| WO | WO-2010/103224 A1 | 9/2010 |
| WO | WO-2015/071610 A1 | 5/2015 |

OTHER PUBLICATIONS

International Searching Authority, "International Search Report," issued in connection with International Patent Application No. PCT/JP2020/028288, dated Oct. 6, 2020.

(Continued)

*Primary Examiner* — Lauren R Colgan
(74) *Attorney, Agent, or Firm* — Foley & Lardner LLP

(57) ABSTRACT

A laminate includes a transparent substrate having a first surface, and a laminated film provided on the first surface of the transparent substrate, wherein the laminated film includes, in a descending order of closeness to the first surface, a first dielectric layer including silicon nitride or zinc oxide or including silicon nitride and zinc oxide, a first layer including titanium oxide and provided on or above the first dielectric layer, a first barrier layer including nickel and chromium and provided on or above the first layer, and a silver-containing metal layer provided directly on the first barrier layer.

9 Claims, 2 Drawing Sheets

(56) References Cited

U.S. PATENT DOCUMENTS

| | | | | |
|---|---|---|---|---|
| 8,337,988 | B2* | 12/2012 | Knoll | G02B 5/26 428/428 |
| 8,507,099 | B2* | 8/2013 | Knoll | C03C 17/366 428/428 |
| 8,557,391 | B2* | 10/2013 | Frank | C03C 17/3626 428/701 |
| 8,679,633 | B2* | 3/2014 | Imran | C03C 17/3639 428/689 |
| 8,734,920 | B2* | 5/2014 | Frank | C03C 17/3639 428/428 |
| 8,940,400 | B1* | 1/2015 | Wuillaume | C03C 17/36 428/688 |
| 9,150,003 | B2* | 10/2015 | Dietrich | C03C 17/366 |
| 9,919,960 | B2* | 3/2018 | Mahieu | C03C 17/3644 |
| 10,125,266 | B2* | 11/2018 | Lage | C03C 17/3644 |
| 10,961,148 | B2* | 3/2021 | Caillet | C03C 17/366 |
| 2002/0037421 | A1* | 3/2002 | Arnaud | C03C 17/3681 428/432 |
| 2004/0086723 | A1* | 5/2004 | Thomsen | C03C 17/3681 428/432 |
| 2005/0123772 | A1* | 6/2005 | Coustet | C03C 17/3652 428/432 |
| 2009/0263596 | A1* | 10/2009 | Lao | C03C 17/36 428/428 |
| 2010/0167034 | A1* | 7/2010 | Depauw | C03C 17/3681 428/432 |
| 2011/0262726 | A1* | 10/2011 | Knoll | C03C 17/36 428/428 |
| 2012/0028009 | A1* | 2/2012 | Gerardin | C03C 17/36 428/212 |
| 2012/0225224 | A1* | 9/2012 | Blacker | C03C 17/3644 427/160 |
| 2013/0164464 | A1* | 6/2013 | Lage | E06B 3/66 204/192.27 |
| 2015/0247961 | A1* | 9/2015 | Jribi | C03C 17/36 359/360 |
| 2015/0307391 | A1 | 10/2015 | Blacker et al. | |
| 2016/0207826 | A1* | 7/2016 | Kim | C03C 17/3626 |
| 2016/0297709 | A1* | 10/2016 | Brossard | E06B 9/24 |
| 2017/0198518 | A1* | 7/2017 | Caillet | C03C 17/3626 |
| 2018/0252027 | A1* | 9/2018 | Ding | C03C 17/3644 |
| 2018/0257980 | A1* | 9/2018 | Saraf | C03C 17/3642 |
| 2018/0259695 | A1* | 9/2018 | Ding | C03C 17/3626 |

OTHER PUBLICATIONS

International Searching Authority, "Written Opinion," issued in connection with International Patent Application No. PCT/JP2020/028288, dated Oct. 6, 2020.

* cited by examiner

LAMINATE AND INSULATED GLAZING

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/028288 filed on Jul. 21, 2020 and designating the U.S., which claims priority to Japanese Patent Application No. 2019-163998 filed on Sep. 9, 2019, the entire contents of which are incorporated herein by reference.

BACKGROUND OF THE INVENTION

1. Field of the Invention

The present invention relates to a laminate and an insulated glazing.

2. Description of the Related Art

Due to the growing awareness of energy conservation in recent years, heat-insulated glass is applied to window glass and the like of buildings.

The heat-insulated glass is also referred to as heat ray reflection glass, and is made by, for example, providing a laminated film including a silver layer on the surface of the glass substrate (for example, PTL 1).

In a case where such heat-insulated glass is applied to window glass, heat rays emitted from the outdoors to the heat-insulated glass are reflected by the laminated film. This inhibits the heat ray from entering the indoors, and can improve the heat-insulating property of the window glass.

CITATION LIST

Patent Literature

PTL 1: Specification of U.S. Pat. No. 8,119,194

SUMMARY OF THE INVENTION

Technical Problem

According to the inventors of the present application, it is often observed that, with the heat-insulated glass, delamination often occurs between layers that constitute the laminated film.

In particular, in recent years, further improvement of the heat-insulating property is demanded for window glass and the like of buildings, and in order to satisfy this demand, the number of layers included in the laminated film of the heat-insulated glass tends to increase.

However, as the number of layers constituting the laminated film of the heat-insulated glass increases, the number of interfaces between layers also increases. Therefore, the problem of delamination between layers may become more prominent in the future.

The present invention has been made in view of such circumstances, and it is an object of the present invention to provide a laminate with an improved adhesion property between layers included in the laminated film in order to attain a high heat-insulating property. Furthermore, it is an object of the present invention to provide insulated glazing including such a laminate.

Solution to Problem

An aspect according to an embodiment of the present invention provides a laminate that includes a transparent substrate having a first surface, and a laminated film provided on the first surface of the transparent substrate, wherein the laminated film includes, in a descending order of closeness to the first surface, a first dielectric layer including silicon nitride or zinc oxide or including silicon nitride and zinc oxide, a first layer including titanium oxide and provided on or above the first dielectric layer, a first barrier layer including nickel and chromium and provided on or above the first layer, and a silver-containing metal layer provided directly on the first barrier layer.

Further, according to the present invention, provided is an insulated glazing including a first glass substrate and a second glass substrate arranged in parallel to each other, wherein the first glass substrate or the second glass substrate is constituted by the above-described laminate, or both are constituted by the above-described laminate.

Advantageous Effects of Invention

According to the present invention, a laminate with an improved adhesion property between layers included in the laminated film in order to attain a high heat-insulating property can be provided. Furthermore, according to the present invention, insulated glazing including such a laminate can be provided.

DETAILED DESCRIPTION OF THE PREFERRED EMBODIMENTS

Figure 1:
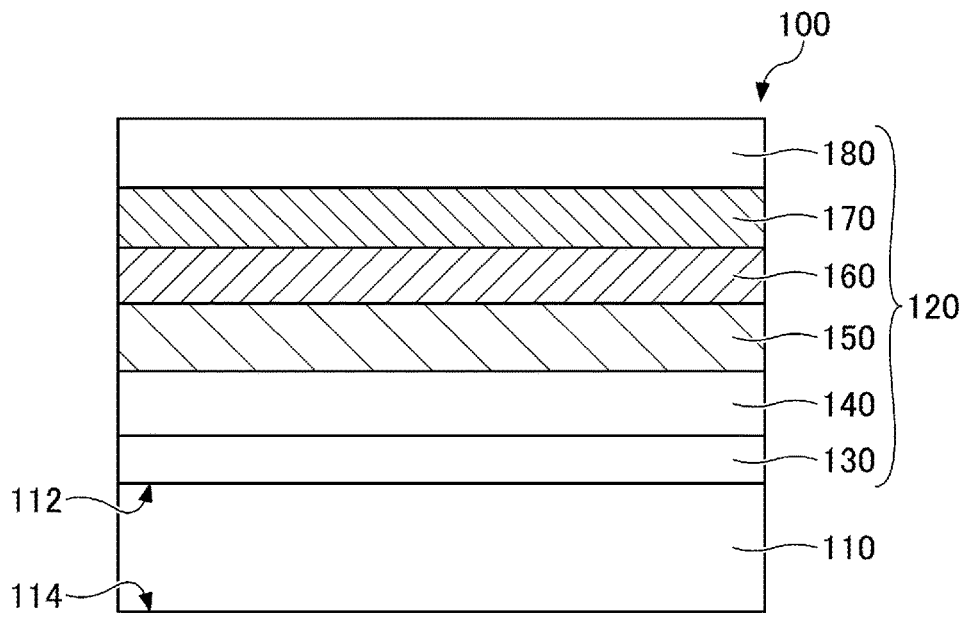
FIG. 1 is a drawing illustrating a schematic cross section of a laminate according to an embodiment of the present invention.

Hereinafter, an embodiment of the present invention is explained.

The embodiment of the present invention is a laminate including:
  a transparent substrate having a first surface; and
  a laminated film provided on the first surface of the transparent substrate,
  wherein the laminated film includes, in a descending order of closeness to the first surface:
    a first dielectric layer including silicon nitride or zinc oxide or including silicon nitride and zinc oxide;
    a first layer including titanium oxide and provided on or above the first dielectric layer;
    a first barrier layer including nickel and chromium and provided on or above the first layer; and
    a silver-containing metal layer provided directly on the first barrier layer.

In the laminate according to the embodiment of the present invention, the first barrier layer is configured to improve the crystal orientation and stabilize the crystal structure of the silver-containing metal layer provided on or above the first barrier layer.

In the laminate according to the embodiment of the present invention, the first layer is provided under the first barrier layer. The first layer includes titanium oxide. It is considered that a fine tetragonal material derived from titanium oxide is formed on the surface of the first layer. It is considered that a fine tetragonal material derived from titanium oxide is formed on the surface of the first layer. It is known that, in the tetragonal material, the crystals are preferentially oriented in the (110) plane (tetragonal lattice) that is the most stable plane with a least interatomic distance. Nickel and chromium, which are the first barrier layer, include a hexagonal close-packed structure and a body-centered cubic lattice, respectively. It is known that, in a case where nickel has a thickness of about several nanometers, the crystals in nickel are preferentially oriented in the plane as indicated in the following Chem. 1 when nickel is on a material in which the crystals are oriented in a tetragonal lattice form.

[Chem. 1]

1 $\bar{1}$ 00 Plane (Tetragonal Lattice)

Also, it is known that, in the body-centered cubic lattice, the crystals are preferentially oriented in the (110) plane (tetragonal lattice) that is the most stable plane with a least interatomic distance. The planes of these materials substantially match each other. Therefore, with the first layer being provided under the first barrier layer, the crystallizability of the first barrier layer can be enhanced even if there is a difference in the crystalline system. Further, because of this, the crystallizability of the silver-containing metal layer provided directly on the first barrier layer can be enhanced. When the crystallizability of the silver-containing metal layer improves, a crystal structure having an orientation that is dominant in a particular direction can be achieved in the silver-containing metal layer. Therefore, the improvement in the crystallizability of the silver-containing metal layer can contribute to the reduction of the sheet resistance value of the entire laminate.

In this case, the sheet resistance value is a parameter correlated with the heat-insulating property of the laminate, and it follows reason that the heat-insulating property of the laminate increases in accordance with a decrease in the sheet resistance value of the laminate. Therefore, in the embodiment of the present invention, the heat-insulating property of the laminate can also be increased in accordance with the effect for reducing the sheet resistance value of the laminate.

Further, the silver-containing metal layer and the first barrier layer are in contact with each other, and zinc oxide is not included between the silver-containing metal layer and the first barrier layer, so that an alloy layer is famed at the interface between the silver-containing metal layer and the first barrier layer. As a result, the inter-layer adhesion between the first barrier layer and the silver-containing metal layer can be improved.

Therefore, in the embodiment of the present invention, a problem of delamination that could occur at the interface between layers constituting a laminated film, such as conventional heat-insulated glass, can be significantly alleviated.

As a result of the above-described effects, in the embodiment of the present invention, a laminate that has a high heat-insulating property and of which the inter-layer adhesion has been improved can be obtained.

In the present application, in order to express a balance between the heat-insulating property and the transparency of the laminate, an index Tv/Rs is introduced. In this case, Tv denotes a visible light transmittance (%) of the laminate, and Rs denotes a sheet resistance value (Ω/sq) of the laminate.

In general, a parameter referred to as a selectivity Se is often used as an index of a balance between the heat-insulating property and the transparency of the laminate. The ratio Tv/Rs can be used as an index that is correlated with this selectivity Se. Specifically, it follows reason that the laminate has a higher transparency and a higher heat-insulating property in accordance with an increase in the transmittance and a decrease in the sheet resistance value, i.e., in accordance with an increase in the ratio Tv/Rs, in the laminate.

In the present application, the term "transparent" means that the visible light transmittance is 50% or greater.

(Laminate According to the Embodiment of the Present Invention)

Hereinafter, a laminate according to the embodiment of the present invention is explained in more detail with reference to FIG. 1.

FIG. 1 schematically illustrates a cross section of a laminate (hereinafter referred to as a "first laminate") according to the embodiment of the present invention.

As illustrated in FIG. 1, the first laminate 100 includes a transparent substrate 110 and a laminated film 120.

The transparent substrate 110 includes a first surface 112 and a second surface 114, and the laminated film 120 is provided on the first surface 112 of the transparent substrate 110.

The laminated film 120 includes a first dielectric layer 130, a first layer 140, a first barrier layer 150, a silver-containing metal layer (which may be hereinafter also simply referred to as a "metal layer") 160, a second barrier layer 170, and a second dielectric layer 180.

The first dielectric layer 130 is constituted by dielectric including silicon nitride, and is configured to reduce the visible light reflectance.

The first layer 140 is constituted by a material including titanium oxide. A fine tetragonal material derived from titanium oxide is considered to be formed on the surface of the first layer. It is known that, in the tetragonal material, the crystals are preferentially oriented in the (110) plane (tetragonal lattice) that is the most stable plane with a least interatomic distance. Further, the first barrier layer has a hexagonal close-packed structure and a body-centered cubic lattice. It is known that, in a case where the hexagonal close-packed structure has a thickness of several nanometers, the crystals in the hexagonal close-packed structure are preferentially oriented in the plane as indicated in the following Chem. 2 when the hexagonal close-packed structure is on a material in which the crystals are oriented in a tetragonal lattice form.

[Chem. 2]

1 $\bar{1}$ 00 Plane (Tetragonal Lattice)

It is known that, in the body-centered cubic lattice, the crystals are preferentially oriented in the (110) plane (tetragonal lattice) that is the most stable plane with a least interatomic distance. The (110) planes of them both substantially match each other. Therefore, with the first layer being provided under the first barrier layer, the crystallizability of the first barrier layer can be enhanced even if there is a difference in the crystalline system.

In the example as illustrated in FIG. 1, the first layer 140 is provided directly under the first barrier layer 150.

The first barrier layer 150 is configured to improve and stabilize the crystal orientation of the metal layer 160. The first barrier layer 150 is constituted by a material including nickel and chromium. The first barrier layer 150 is transparent.

As illustrated in FIG. 1, the first barrier layer 150 is provided directly under the metal layer 160.

The metal layer 160 includes silver, and is configured to reflect heat rays incident upon the first laminate 100. The metal layer 160 is transparent.

As illustrated in FIG. 1, the metal layer 160 is provided directly on the first barrier layer 150.

The second barrier layer 170 and the second dielectric layer 180 are configured to protect the metal layer 160 from the outside. However, the second barrier layer 170 and the second dielectric layer 180 do not have to be provided.

In the first laminate 100, the first layer 140 is provided directly under the first barrier layer 150, and the metal layer 160 is provided directly on the first barrier layer 150. In the first laminate 100 having such a configuration, the first layer 140 can improve the crystallizability of the first barrier layer 150. Furthermore, this can also improve the crystallizability of the metal layer 160.

Further, the silver-containing metal layer and the first barrier layer are in contact with each other, and zinc oxide is not included between the silver-containing metal layer and the first barrier layer, so that an alloy layer is famed at the interface between the silver-containing metal layer and the first barrier layer. As a result, the inter-layer adhesion between the first barrier layer 150 and the metal layer 160 can be improved.

Further, with the improvement of the crystallizability of the metal layer 160, the sheet resistance value of the metal layer 160 is reduced, and accordingly, the sheet resistance value of the laminated film 120 and further the sheet resistance value of the first laminate 100 can be reduced. Therefore, in the first laminate 100, a high ratio Tv/Rs can be obtained.

As a result of the above-described effects, with the first laminate 100, a high heat-insulating property can be obtained, and furthermore, the inter-layer adhesion can be increased significantly.

(Configuration of Each Member Included in the Laminate According to the Embodiment of the Present Invention)

Next, the configuration of each member included in the laminate according to the embodiment of the present invention is explained in detail. In this case, using the first laminate 100 as an example, the components thereof are explained. Therefore, members are denoted with the reference numerals indicated in FIG. 1.

(Transparent Substrate 110)

The transparent substrate 110 is constituted by a transparent material such as, for example, resin or glass.

(First Dielectric Layer 130)

The first dielectric layer 130 is constituted by dielectric including silicon nitride. The first dielectric layer 130 may further include Al. For example, the first dielectric layer 130 may be constituted by SiAlN.

The first dielectric layer 130 has a thickness in a range of 10 nm to 60 nm. The thickness is preferably in a range of 20 nm to 50 nm.

(First Layer 140)

As described above, the first layer 140 includes titanium oxide. Even if the first layer 140 includes a hexagonal material, similar effects can be obtained.

The first layer 140 is preferably constituted by titanium oxide. Particularly preferably, titanium oxide is titanium dioxide ($TiO_2$).

The thickness of the first layer 140 is, for example, in a range of 1 nm to 20 nm. The thickness is preferably in a range of 3 nm to 15 nm. When the thickness is in the above range, a certain amount of fine tetragonal material derived from titanium oxide is considered to be formed on the surface of the first layer 140.

Further, a ratio of the thickness of the first layer 140 to the thickness of the first barrier layer 150 is preferably in a range of 0.1 to 2.5, and particularly preferably in a range of 0.25 to 2.0. When the ratio of the thickness is equal to or more than 0.1, the crystallizability of the first barrier layer 150 can be enhanced sufficiently. When the ratio of the thickness is equal to or less than 2.5, a high degree of adhesion can be secured. Specifically, when the ratio of the thickness is in the above-described range, a high degree of adhesion and a high ratio Tv/Rs can be obtained.

(First Barrier Layer 150)

As described above, the first barrier layer 150 includes nickel and chromium.

The ratio of nickel to chromium included in the first barrier layer 150 is not particularly limited, but normally, the ratio of nickel to chromium is in a range of 50:50 to 90:10 in mass ratio.

The first barrier layer 150 preferably has a thickness in a range of 1 nm to 8 nm, and more preferably in a range of 1 nm to 6 nm. When the thickness of the first barrier layer 150 is defined as 8 nm or less, a high visible light transmittance and a high ratio Tv/Rs can be obtained. When the thickness of the first barrier layer 150 is equal to or more than 1 nm, a high degree of adhesion can be obtained.

(Metal Layer 160)

The metal layer 160 is constituted by a layer including silver. The metal layer may be constituted by, for example, a silver alloy. Examples of such silver alloys include Ag—Au alloy, Ag—Pd alloy, Ag—Ni alloy, and the like. The amount of silver included in the silver alloy is preferably equal to or more than 90 mass %.

The metal layer 160 has a thickness in a range of 7 nm to 25 nm. When the thickness of the metal layer 160 is equal to or less than 25 nm, the transparency of the metal layer 160 increases.

(Second Barrier Layer 170)

The second barrier layer 170 may be constituted by a material similar to the first barrier layer 150. The second barrier layer 170 may be constituted by multiple films.

The thickness of the second barrier layer 170 is not limited thereto, and is, for example, in a range of 0.1 nm to 10 nm.

As described above, the second barrier layer 170 does not have to be provided.

(Second Dielectric Layer 180)

The second dielectric layer 180 is constituted by any given dielectric material. The second dielectric layer 180 may be constituted by, for example, the same material as the first dielectric layer 130.

Alternatively, in order to attain a barrier and abrasion resistance, the second dielectric layer 180 may be constituted by a compound represented by a general expression $Si_xAl_yN_zO_w$, in which $0 \leq y/(x+y) \leq 0.5$, $0 \leq w < z$, $0.8 < z/(x+y) < 1.5$, and $0 \leq w/(x+y) \leq 0.2$ are satisfied.

The thickness of the second dielectric layer 180 is not limited thereto, and is, for example, in a range of 20 nm to 60 nm.

As described above, the second dielectric layer 180 does not have to be provided.

(Laminate According to Another Embodiment of the Present Invention)

Next, a laminate according to another embodiment of the present invention is explained with reference to FIG. 2.

Figure 2:
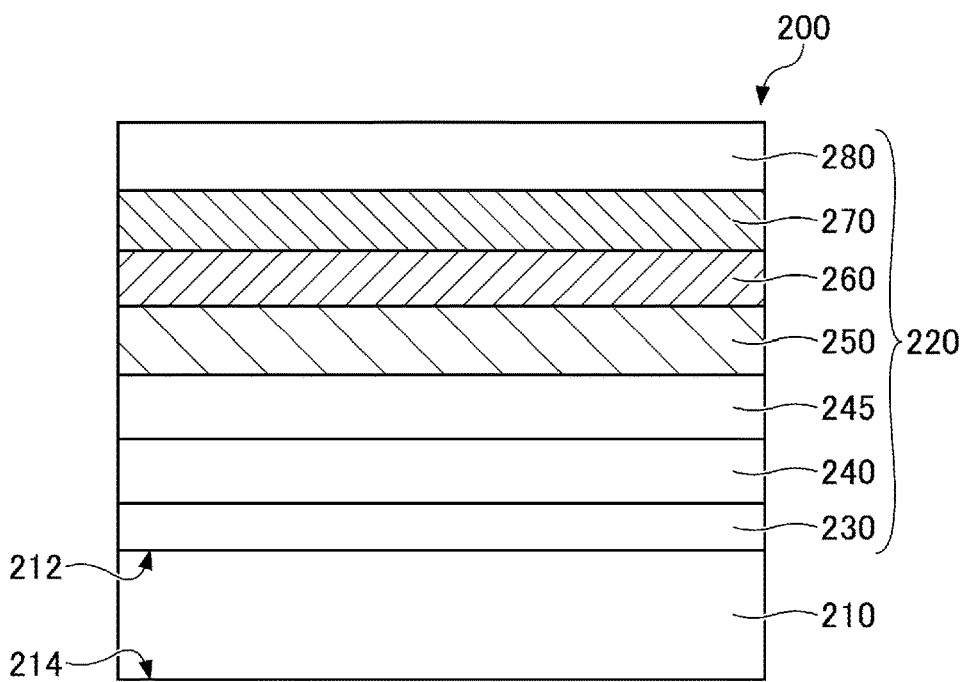
FIG. 2 is a drawing illustrating a schematic cross section of another laminate according to an embodiment of the present invention.

FIG. 2 schematically illustrates a cross section of the laminate according to the embodiment of the present invention (hereinafter referred to as a "second laminate").

As illustrated in FIG. 2, the second laminate 200 includes a transparent substrate 210 and a laminated film 220.

The transparent substrate 210 includes a first surface 212 and a second surface 214, and the laminated film 220 is provided on the first surface 212 of the transparent substrate 210.

The transparent substrate 210 may have substantially the same configuration as the transparent substrate 110 of the first laminate 100 described above.

The laminated film 220 includes a first dielectric layer 230, a first layer 240, a second layer 245, a first barrier layer 250, a silver-containing metal layer (which may be hereinafter simply referred to as a "metal layer") 260, a second barrier layer 270, and a second dielectric layer 280.

In this case, with regard to the feature of each layer constituting the laminated film 220 other than the second layer 245, the above description about the laminated film 120 in the first laminate 100 can be referred to. Therefore, hereinafter, the configuration and the feature of the second layer 245 are explained.

The second layer 245 is provided directly on the first layer 240, and is provided directly under the first barrier layer 250.

The second layer 245 includes at least one selected from the group consisting of metallic titanium, metallic chromium, titanium oxide (TiOx, in which x is 0.01 or more and is less than 2.0), metallic niobium, chromium oxide, and aluminum nitride. In particular, the second layer 245 is preferably constituted by metallic titanium or titanium oxide.

The second layer 245 is configured to further enhance the adhesion between the first layer 240 and the first barrier layer 250. Specifically, the second layer 245 is interposed between the first layer 240 and the first barrier layer 250, which makes it less likely to cause delamination between the first layer 240 and the first barrier layer 250.

The second layer 245 is formed to be relatively thin, and has a thickness in a range of, for example, 0.1 nm to 10 nm. This is to inhibit the second layer 245 from obstructing the effect exerted by the first layer 240 on the first barrier layer 250 with respect to crystallizability.

In other words, the second layer 245 is formed to be thin, so that the crystallizability of the first barrier layer 250 having the crystal structure in which the crystals are preferentially oriented in the tetragonal lattice form can be enhanced by the fine tetragonal material included in the first layer 240.

The ratio of the thickness of the second layer 245 to the thickness of the first barrier layer 250 is preferably in a range of 0.02 to 10 and particularly preferably in a range of 0.08 to 8.0. When the ratio of the thickness is in the above range, a high degree of adhesion and a high ratio Tv/Rs can be obtained.

In this manner, in the second laminate 200, the adhesion between the respective layers included in the laminated film 220 can be significantly enhanced, in a manner similar to the first laminate 100.

The second layer 245 is configured so as not to obstruct the consistency in the crystal structures of the first layer 240 and the first barrier layer 250. Therefore, with the first layer 240, the crystallizability of the first barrier layer 250 can be enhanced, and accordingly, the crystallizability of the metal layer 260 can also be enhanced.

As a result, the sheet resistance value of the metal layer 260 is reduced, and accordingly, the sheet resistance value of the laminated film 220 and further the sheet resistance value of the second laminate 200 can be reduced. Therefore, in the second laminate 200, a high ratio Tv/Rs can be obtained.

As a result of the above-described effects, with the second laminate 200, a high heat-insulating property can be obtained, and furthermore, the inter-layer adhesion can be increased significantly.

(Example of Application of Laminate According to the Embodiment of the Present Invention)

The laminate according to the embodiment of the present invention can be applied to members that require both of a high heat-insulating property and a high transparency such as, for example, window glass of buildings and doors of cooking ovens.

Figure 3:
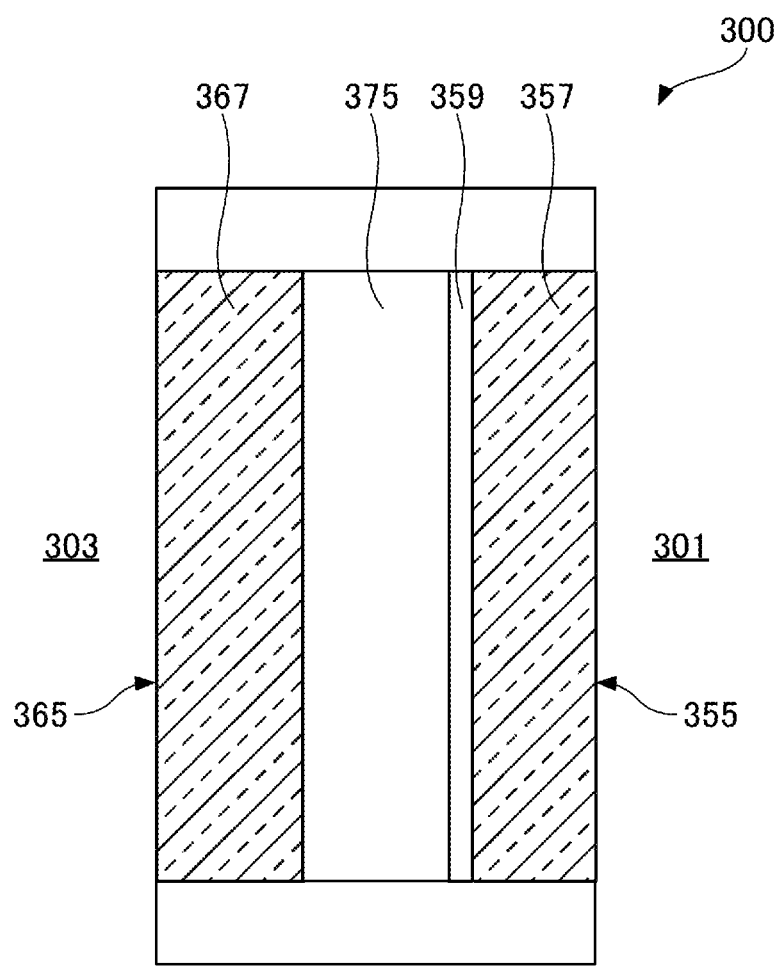
FIG. 3 is a cross sectional view schematically illustrating a configuration of window glass of a building to which the laminate according to the embodiment of the present invention is applied.

FIG. 3 schematically illustrates a cross section of window glass of a building (hereinafter simply referred to as "window glass 300") to which the laminate according to the embodiment of the present invention is applied.

As illustrated in FIG. 3, the window glass 300 has an insulated glazing structure, and is made by arranging a first glass member 355 and a second glass member 365 spaced apart from each other. An internal space 375 is formed between them. The internal space 375 may be vacuum or may be filled with inert gas.

For example, the window glass 300 is provided on a sash and the like of a building, with a surface of the window glass 300 on the side of the first glass member 355 being on an indoor side 301, and a surface of the window glass 300 on the side of the second glass member 365 being on an outdoor side 303.

The first glass member 355 includes a first glass substrate 357. On one of the surfaces of the first glass substrate 357, a laminated film 359 is provided. The laminated film 359 is provided to face the internal space 375.

In contrast, the second glass member 365 includes a second glass substrate 367. In the second glass member 365, the second glass substrate 367 alone may be used, or one of the surfaces of the second glass substrate 367 may be provided with a laminated film.

In this case, the first glass member 355 is constituted by the laminate according to the embodiment of the present invention. For example, the first glass member 355 may be constituted by the first laminate 100 or the second laminate 200 described above. In this case, the first glass substrate 357 is the transparent substrate 110 or the transparent substrate 210 described above.

In the above-described window glass 300, the adhesion between the layers can be significantly improved by the laminated film 359 included in the first glass member 355. Further, the first glass member 355 has a high ratio Tv/Rs. Therefore, in the window glass 300, a high heat-insulating property can be achieved, and furthermore, the inter-layer delamination in the laminated film 359 can be alleviated.

In particular, in a case where not only the first glass member 355 but also the second glass member 365 are constituted by the laminate according to the embodiment of the present invention, the window glass 300 with a higher heat-insulating property can be provided.

EXAMPLES

Hereinafter, Examples of the present invention are explained. In the following description, Example 1 to Example 4 are Examples, and Example 11 to Example 13 are Comparative examples.

Example 1

According to the following method, a laminate was produced by forming a laminated film on one of the surfaces of a glass substrate.

As the glass substrate, soda lime glass with dimensions of 100 mm long, 50 mm wide, and 3.0 mm thick was used.

The laminated film was constituted by 6 layers that are, from the side closer to the glass substrate, a first dielectric layer, a first layer, a first barrier layer, a silver-containing metal layer, a second barrier layer, and a second dielectric layer.

The first dielectric layer was silicon nitride containing aluminum (target film thickness: 40 nm). The first layer was $TiO_2$ (target film thickness: 3 nm). The first barrier layer was NiCr (target film thickness: 2 nm). The silver-containing metal layer was metal silver (target film thickness: 16 nm). The second barrier layer was NiCr (target film thickness: 1 nm). The second dielectric layer was silicon nitride containing aluminum (target film thickness: 51 nm).

All of these layers were deposited by a sputtering method.

Specifically, for deposition of the first dielectric layer, a planar target made of Si-10 wt % Al was used, and a mixed gas of argon and nitrogen was used as the discharge gas. A ratio of argon to nitrogen in the mixed gas was argon:nitrogen=40:60 (sccm). The pressure during deposition was 0.42 Pa, and the incident power density was 36 kW/m².

For deposition of the first layer, a planar target made of metal Ti was used, and oxygen gas was used as the discharge gas. The pressure during deposition was 0.42 Pa, and the incident power density was 36 kW/m².

For deposition of the first barrier layer, a planar target made of Ni-20 wt % Cr was used, and argon gas was used as the discharge gas. The pressure during deposition was 0.48 Pa.

For deposition of the silver-containing metal layer, a planar target made of silver was used, and argon gas was used as the discharge gas. The pressure during deposition was 0.46 Pa.

For deposition of the second barrier layer, a planar target made of Ni-20 wt % Cr was used, and argon gas was used as the discharge gas. The pressure during deposition was 0.48 Pa.

For deposition of the second dielectric layer, a planar target made of Si-10 wt % Al was used. A mixed gas of argon and nitrogen was used as the discharge gas. A ratio of argon to nitrogen in the mixed gas was argon:nitrogen=40:60 (sccm). The pressure during deposition was 0.42 Pa.

The depositions of these layers were performed in the same sputtering chamber.

After the laminated film was deposited on the glass substrate, the glass substrate was baked at 730° C. for 3 minutes in the air atmosphere.

As a result, the laminate (hereinafter referred to as a "Sample 1") was produced.

Example 2

According to substantially the same method as Example 1, a laminate was produced.

However, in this Example 2, the target film thickness of the first barrier layer was 1.4 nm. Further, Ti was deposited as the second layer between the first layer and the first barrier layer.

For deposition of the second layer, a planar target made of metal Ti was used, and argon gas was used as the discharge gas. The pressure during deposition was 0.48 Pa. The target thickness of the second layer was 1 nm.

Other production conditions were substantially the same as Example 1.

As a result, the laminate (hereinafter referred to as a "Sample 2") was produced.

Example 3

According to substantially the same method as Example 1, a laminate was produced. However, in this Example 3, the target film thickness of the first layer was set to 1 nm.

As a result, the laminate (hereinafter referred to as a "Sample 3") was produced.

Example 4

According to substantially the same method as Example 1, a laminate was produced.

However, in this Example 4, the target film thickness of the first barrier layer was 1.4 nm. Further, TiOx was deposited as the second layer between the first layer and the first barrier layer.

For deposition of the second layer, a planar target made of metal Ti was used, and a mixed gas of argon and oxygen was used as the discharge gas. A ratio of argon to oxygen in the mixed gas was argon:oxygen=70:10 (sccm). The pressure during deposition was 0.47 Pa. The target thickness of the second layer was 3.0 nm.

Other production conditions were substantially the same as Example 1.

As a result, the laminate (hereinafter referred to as a "Sample 4") was produced.

Example 11

According to substantially the same method as Example 1, a laminate was produced.

However, in this Example 11, without depositing the first layer, the first barrier layer was deposited directly on the first dielectric layer.

Further, the first barrier layer was ZnO:Al (target film thickness: 5 nm).

For deposition of the first barrier layer, a target made of $ZnO+3$ wt % $AlO_2$ was used, and a mixed gas of argon and oxygen was used as the discharge gas. A ratio of argon to oxygen in the mixed gas was argon:oxygen=50:50 (sccm). The pressure during deposition was 0.46 Pa.

Other production conditions were substantially the same as Example 1.

As a result, the laminate (hereinafter referred to as a "Sample 11") was produced.

Example 12

According to substantially the same method as Example 1, a laminate was produced.

However, in this Example 12, without depositing the first layer, the first barrier layer was deposited directly on the first dielectric layer. Further, the target film thickness of the first barrier layer was 1.4 nm.

Other production conditions were substantially the same as Example 1.

As a result, the laminate (hereinafter referred to as a "Sample 12") was produced.

Example 13

According to substantially the same method as Example 1, a laminate was produced.

However, in this Example 13, the target film thickness of the first layer was 3 nm. Further, NiCr was deposited as the second layer between the first layer and the first barrier layer. Further, the first barrier layer was ZnO:Al (target film thickness: 5 nm).

For deposition of the second layer, a planar target made of NiCr was used, and argon gas was used as the discharge gas. The pressure during deposition was 0.48 Pa. The target thickness of the second layer was 2 nm.

For deposition of the first barrier layer, a target made of $ZnO+3$ wt % $AlO_2$ was used, and a mixed gas of argon and oxygen was used as the discharge gas. A ratio of argon to oxygen in the mixed gas was argon:oxygen=50:50 (sccm). The pressure during deposition was 0.46 Pa.

Other production conditions were substantially the same as Example 1.

As a result, the laminate (hereinafter referred to as a "Sample 13") was produced.

The following Table 1 summarizes the configurations of the laminated films of Samples 1 to 3 and Samples 11 to 13. In the Samples, the layers higher than the silver-containing metal layer have the same technical specifications, which are omitted in Table 1.

A ratio Tv/Rs was calculated from the visible light transmittance Tv (%) and the sheet resistance value Rs (Ω/Sq) obtained.

(Adhesion Evaluation Examination)

An adhesion evaluation examination of a laminated film was conducted by using each Sample.

For the adhesion evaluation examination, a surface characteristics tester (IMC-1550, manufactured by Imoto Machinery Co., LTD.) was used. First, a cotton lawn (SDCE Cotton Lawn, manufactured by SDC Enterprises Limited) was attached to the end of the indentor (a circular shape with a diameter of 2 cm) supplied with this device.

Next, after the surface of the laminate film of the Sample is wetted with pure water, the end of the indenter attached with the cotton lawn was pressed against the laminated film. The contact area of the indenter was 3.1 cm$^2$.

Next, the Sample was fixed, and while a load of 1000 g was applied to the indentor, the indentor was reciprocally moved 500 times in the horizontal direction. The movement distance in the back and forth paths in a single reciprocal movement was 40 mm.

Thereafter, the sheet resistance value of the Sample was measured by using the above-described sheet resistance measurement device.

The adhesions of the layers included in the laminated film were evaluated from a change in the sheet resistance value of the Sample before and after the examination.

In this evaluation examination, the delamination resistance in the shear direction at the interface of the respective layers included in the laminated film can be evaluated. Specifically, it follows reason that a smaller change in the

TABLE 1

| Sample | Configuration of Laminated Film | | | | | Ratio of Film Thicknesses: First Layer/ First Barrier Layer | Ratio of Film Thicknesses: Second Layer/ First Barrier Layer |
|---|---|---|---|---|---|---|---|
| | First Dielectric Layer | First Layer | Second Layer | First Barrier Layer | Silver-Containing Metal Layer | | |
| 1 | SiAlN | TiO$_2$ | — | NiCr | Ag | 1.5 | — |
| 2 | SiAlN | TiO$_2$ | Ti | NiCr | Ag | 2.1 | 0.71 |
| 3 | SiAlN | TiO$_2$ | — | NiCr | Ag | 0.5 | — |
| 4 | SiAlN | TiO$_2$ | TiO$_2$ | NiCr | Ag | 2.1 | 2.14 |
| 11 | SiAlN | — | — | ZnO: Al | Ag | — | — |
| 12 | SiAlN | — | — | NiCr | Ag | — | — |
| 13 | SiAlN | TiO$_2$ | NiCr | ZnO: Al | Ag | 0.6 | 0.4 |

(Evaluation)

The following evaluations were conducted by using each Sample.

(Evaluation of Ratio Tv/Rs)

A visible light transmittance Tv (%) and a sheet resistance value Rs (Ω/Sq) were measured by using each Sample.

For the measurement of the visible light transmittance, a luminous transmittance meter (TLV-304-LC, manufactured by Asahi Spectra Co., Ltd.) was used. The transmittance of light from the Illuminant A incident from a surface facing the transparent substrate, measured using a luminous correction filter, was adopted as a visible light transmittance Tv (%) of each Sample.

For measurement of the sheet resistance value Rs, a sheet resistance measurement device (Conductance Monitor model 717B, manufactured by Delcom Instruments, Inc.) was used. The measurement surface was a surface of a laminated film.

sheet resistance value before and after the examination indicates a higher inter-layer adhesion.

The following Table 2 summarizes evaluation examination results obtained from the respective Samples.

TABLE 2

| | | | Adhesion Evaluation Examination | | |
|---|---|---|---|---|---|
| Sample | Visible Light Transmittance Tv [%] | Tv/Rs | Pre-Examination Sheet Resistance [Ω/sq] | Post-Examination Sheet Resistance [Ω/sq] | Amount of Change [Ω/sq] |
| 1 | 65.4 | 24.2 | 2.70 | 2.70 | 0.00 |
| 2 | 64.1 | 22.4 | 2.86 | 2.86 | 0.00 |
| 3 | 59.5 | 22.1 | 2.69 | 2.69 | 0.00 |
| 4 | 63.8 | 22.3 | 2.86 | 2.86 | 0.00 |

TABLE 2-continued

| | | | Adhesion Evaluation Examination | | |
|---|---|---|---|---|---|
| Sample | Visible Light Transmittance Tv [%] | Tv/Rs | Pre-Examination Sheet Resistance [Ω/sq] | Post-Examination Sheet Resistance [Ω/sq] | Amount of Change [Ω/sq] |
| 11 | 68.0 | 24.0 | 2.83 | 20.60 | 17.77 |
| 12 | 60.1 | 18.0 | 3.34 | 3.34 | 0.00 |
| 13 | 68.3 | 24.8 | 2.75 | 15.20 | 12.45 |

As shown in Table 2, in the Sample 11 and the Sample 13, before and after the adhesion evaluation examination, the values of the sheet resistances have greatly increased. Accordingly, it is considered that, in the Sample 11 and the Sample 13, a shear-like delamination occurred at the interface between a layer and a layer in the laminated film.

Further, it is understood that, in the Sample 12, a ratio Tv/Rs was low, and a fairly high heat-insulating property was not obtained.

In this manner, in the Sample 11 to the Sample 13, characteristics having both of a high heat-insulating property and a high degree of adhesion were not obtained.

In the Sample 1 to Sample 4, the ratios Tv/Rs were sufficiently high. Further, in the Sample 1 to the Sample 4, before and after the adhesion evaluation examination, a change in the sheet resistance value was not observed.

As described above, it is confirmed that the Sample 1 to the Sample 4 had high heat-insulating properties and attained high degrees of adhesions.

What is claimed is:

1. A laminate consisting of:
   a transparent substrate having a first surface; and
   a laminated film provided on the first surface of the transparent substrate,
   wherein the laminated film consists of, in a descending order of closeness to the first surface:
   a first dielectric layer comprising silicon nitride;
   a first layer comprising titanium oxide and provided on or above the first dielectric layer;
   an optional second layer comprising titanium oxide or titanium and provided on or above the first layer;
   a first barrier layer comprising nickel and chromium and provided on or above the first layer;
   a metal layer comprising silver and provided directly on the first barrier layer;
   a second barrier layer comprising nickel and chromium and provided on or above the first barrier layer; and
   a second dielectric layer comprising silicon nitride.

2. The laminate according to claim 1, wherein the first layer consists of titanium oxide.

3. The laminate according to claim 1, wherein a ratio of a thickness of the first layer to a thickness of the first barrier layer is in a range of 0.1 to 2.5.

4. The laminate according to claim 1, wherein the first layer directly contacts the first barrier layer.

5. The laminate according to claim 1, wherein the second layer is provided between and in contact with the first layer and the first barrier layer.

6. The laminate according to claim 5, wherein a ratio of a thickness of the second layer to a thickness of the first barrier layer is in a range of 0.02 to 10.

7. The laminate according to claim 1, wherein the laminated film consists of:
   the first dielectric layer consisting of SiAlN and having a thickness from 10 nm to 60 nm;
   the first layer consisting of $TiO_2$ and having a thickness from 1 nm to 20 nm;
   the second layer consisting of $TiO_2$ or titanium and having a thickness from 0.1 nm to 10 nm;
   the first barrier layer consisting of NiCr and having a thickness from 1 nm to 8 nm;
   the metal layer consisting of silver and having a thickness from 7 nm to 25 nm;
   the second barrier layer consisting of NiCr and having a thickness from 0.1 nm to 10 nm; and
   the second dielectric layer consisting of $Si_xAl_yN_zO_w$, in which $0 \leq y/(x+y) \leq 0.5$, $0 \leq w < z$, $0.8 < z/(x+y) < 1.5$, and $0 \leq w/(x+y) \leq 0.2$, and having a thickness from 20 nm to 60 nm.

8. The laminate according to claim 1, wherein the laminated film consists of:
   the first dielectric layer consisting of SiAlN and having a thickness from 10 nm to 60 nm;
   the first layer consisting of $TiO_2$ and having a thickness from 1 nm to 20 nm;
   the first barrier layer consisting of NiCr and having a thickness from 1 nm to 8 nm;
   the metal layer consisting of silver and having a thickness from 7 nm to 25 nm;
   the second barrier layer consisting of NiCr and having a thickness from 0.1 nm to 10 nm; and
   the second dielectric layer consisting of $Si_xAl_yN_zO_w$, in which $0 \leq y/(x+y) \leq 0.5$, $0 \leq w < z$, $0.8 < z/(x+y) < 1.5$, and $0 \leq w/(x+y) \leq 0.2$, and having a thickness from 20 nm to 60 nm.

9. An insulated glazing comprising a first glass substrate and a second glass substrate arranged in parallel to each other,
   wherein the first glass substrate or the second glass substrate is constituted by the laminate of claim 1, or the first glass substrate and the second glass substrate are constituted by the laminate of claim 1.

* * * * *